Aug. 18, 1942.　　　　E. COBURN　　　　2,293,328
LEVELING MECHANISM
Filed July 30, 1940　　　2 Sheets-Sheet 2

ERNEST COBURN
Inventor

By Herbert E. Smith
Attorney

Patented Aug. 18, 1942

2,293,328

UNITED STATES PATENT OFFICE 2,293,328

LEVELING MECHANISM

Ernest Coburn, Spokane, Wash.; Bess D. Coburn executrix of said Ernest Coburn, deceased Application July 30, 1940, Serial No. 348,427

8 Claims. (Cl. 280—6)

My present invention relates to improvements in a leveling mechanism for land vehicles.

This invention is particularly designed for harvester mechanisms to adapt them so that they may be operated upon hilly land. For the purposes of this disclosure it will be assumed that the invention has been applied to such a harvesting mechanism. It should be apparent, however, and it is specifically reserved, that this invention is not to be limited by the disclosure of the application to a harvesting mechanism, and it is believed to be entirely within the scope of the invention to apply it to any other vehicle in which it is desirable to maintain the vehicle body in a level condition, no matter how it may be tipped.

Many previous attempts have been made to provide vehicular leveling mechanisms, and particularly such mechanisms for harvesters, and while some prior developments have approached limited success, it has often been true that their success has been reached only by the use of extremely complicated and unwieldy arrangements and combinations of elements which are not practical under actual operating conditions. In other instances, the leveling mechanisms heretofore produced have required that they be built into the structure in its original construction and they have not lent themselves to be adapted to already existent vehicles. Earlier attempts have, through their complexities, been beyond the skill of the average operator to maintain in an efficient operating condition, and in addition, due to their complexities, have been extremely expensive in their original cost, as well as very costly to maintain.

It is an important object of my invention to provide a simple, efficient leveling mechanism which can be incorporated in a land vehicle in the stages of original construction or can be adapted to already existent vehicles without a material alteration or reconstruction of the original vehicle.

Another object of my invention resides in the use of hydraulic means for controlling and operating the leveling features in my leveling mechanism.

A further object of my invention has been the provision of a leveling mechanism which may be controlled remotely by an operator who need not be at the actual point where the leveling mechanism operates, or which may be controlled remotely by automatic means actuated by changes in the ground surface from the level to a sloping condition, or vice versa.

Still another object of the invention has been the provision of a leveling mechanism which in operation will permit the maintenance of at least one of the ground-engaging members in a true perpendicular plane no matter what ground plane may be encountered, while at the same time permitting the other principal ground-engaging member to assume a plane substantially at right angles to the plane of the ground surface over which the ground engaging member is caused to travel.

Other objects and advantages of the invention will be apparent during the course of the following description wherein for the purpose of illustration I have shown the adaptation of my invention to a machine of the type commonly referred to as a combine harvester. There are a multitude of other machines and vehicles in which it is desired to maintain a leveling plane and my invention is as equally applicable thereto.

In the drawings

Figure 4 is a view in elevation and partially in section taken on line 4—4 of Figure 1.

Figure 1:
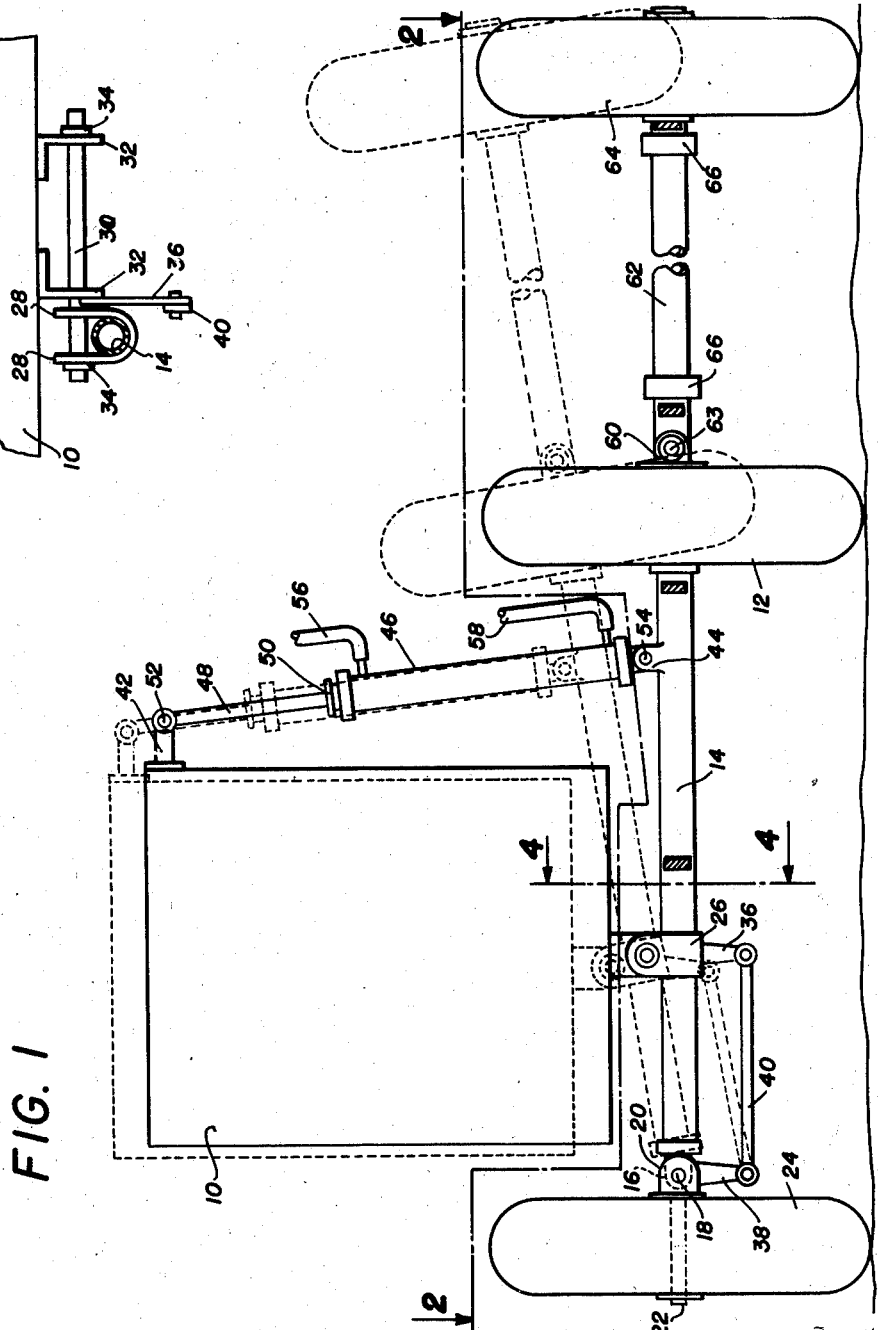
Figure 1 represents a view in elevation of my leveling mechanism as employed in connection with a harvesting machine.
Figure 2:
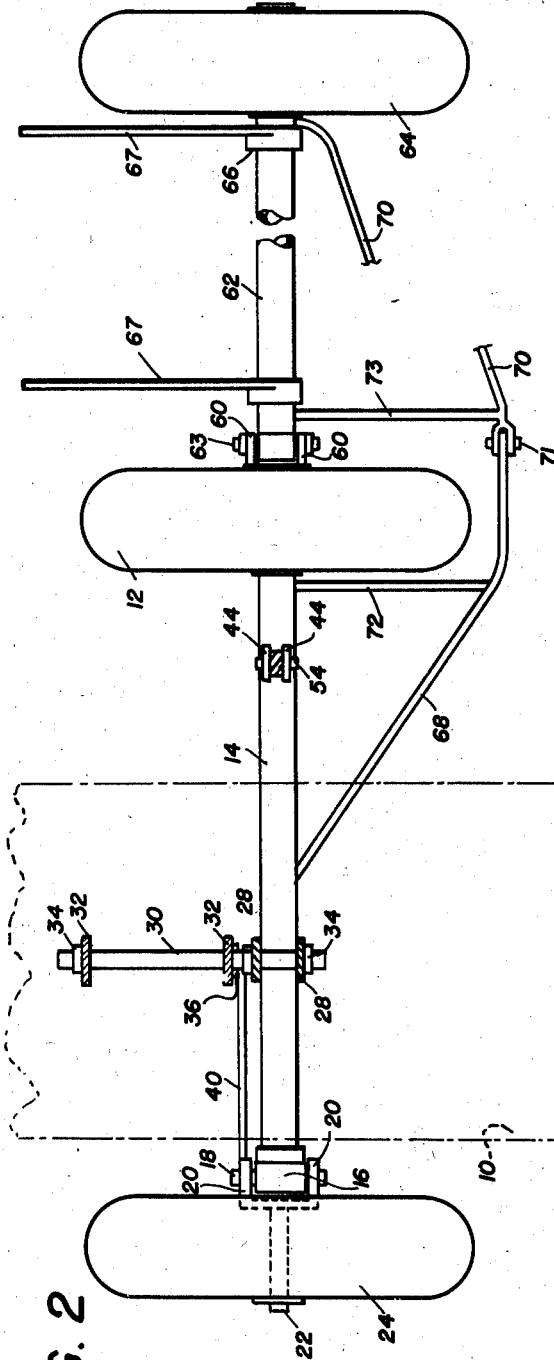
Figure 2 is a plan view taken along line 2—2 of Figure 1 with portions in section as indicated.

The numeral 10 designates a vehicle body which may enclose a harvester mechanism that it is desired be supported above the ground and to be maintained at all times in a level plane. For the purposes of supporting the vehicle body 10 I employ a ground-engaging member 12, here shown to be a pneumatic wheel, which is mounted for rotation upon a main axle member 14 that may assume the form of a tubular shaft. On the end of the shaft 14 opposite the wheel 12 is provided a pivotal knuckle 16 which supports a pivot pin 18 and the pin 18 also engages in the flanges 20 of a yoke formed on the end of the axle 22.

A second ground-engaging member 24 similar to the member 12 is also in this instance illustrated as a pneumatic wheel. It is mounted for rotation on the stub shaft 22.

Intermediate of the ends of the shaft 14 I form a U-shaped yoke 26 partially encircling the shaft and having a pair of upstanding ears 28—28. A shaft 30 passes through the ears 28—28 in a manner at right angles to the general axis of the shaft 14. On the underside of the body 10 I provide shaft-receiving flanges 32—32 through which the shaft 30 is passed. Collars 34 serve to maintain the shaft 32 in position in the ears 28—28 and flanges 32—32.

Figure 3:
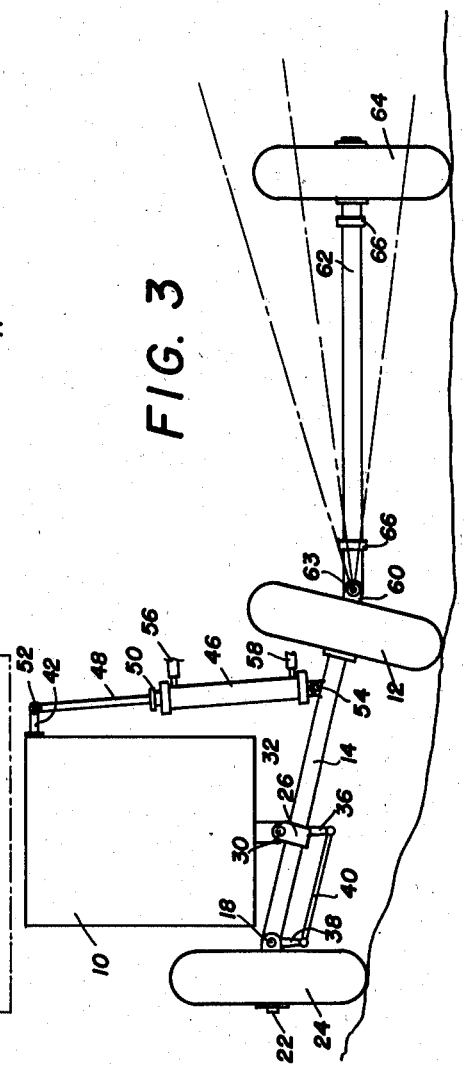
Figure 3 is an elevational view at reduced scale and similar to Figure 1, but illustrating the adaptability of the machine and the leveling mechanism to a different ground condition.

An arm 36 depends from the body 10, and in Figure 4 it is indicated as being secured to the left flange 32 of the drawing and a similar arm 38 depends from one of the ears 28 of the yoke on the axle 22. A connecting link 40 joins the lower ends of the arms 36 and 38 and is pivotally connected at each end. As is shown in Figures 1 and 3, a bracket 42 is provided in the upper right corner of the vehicle as it appears in these figures. A pair of upstanding ears 44 are provided on the right-hand end of the shaft 14 adjacent to wheel 12.

Between the bracket 42 and the ears 44 is mounted a hydraulic motor comprising a cylinder 46, a piston rod 48 upon which is mounted a piston (not shown) within the cylinder 46, and a gland 50 that serves to maintain the cylinder against leaking. The piston rod 48 is swingingly attached to the bracket 42 by means of the pivot pin 52 and the cylinder 46 is swingingly attached to the upstanding ears 44 by means of the pin 54.

Supply-discharge lines 56 and 58 are introduced near the ends of the cylinder 46 and may be connected to a suitable source of hydraulic energy and valve control means of a nature suitable to introduce as well as permit the discharge of hydraulic fluid from either chamber within the cylinder 46.

To the right side of the member 12 on the shaft 14 I provide a pair of pivot ears 60 and I pivotally mount an extension shaft 62 thereto by means of the pivot pin 63. On the outer end of the shaft 62 I mount for rotation another ground-engaging member 64, such as a pneumatic wheel. Upon the shaft 62 by means of the fixed collars 66 and the supporting arms 67 is usually carried the cutter mechanism and laterally operating conveyer mechanism for conveying cut grain and the like into the vehicle body 10, where it is threshed, separated, and cleaned.

The shaft 62, it will be seen, is mounted for pivotal movement independent of the shaft 14 and this independent pivotal movement is indicated by dotted lines in Figure 3.

A pivoted truss, including the runner members 68 and 70 joined by pivot pin 71, and also including braces 72 and 73 attached to the axle shafts 14 and 62, respectively, tends to assure the maintenance of the wheel 64 in its normal position as the vehicle is advanced over the ground by means of draft power applied to the vehicle.

In view of the fact that the scope of the present invention is only that of a leveling mechanism, no effort is made herein to delineate or describe the structure and manner in which the vehicle is advanced over the ground. Rather the description is limited to the structure of the vehicle and its leveling mechanism and the manner in which that structure is operated.

Hydraulic fluid under pressure will be supplied to the cylinder 46 in any conventional manner and it will be controlled by any valve mechanism which will operate simply and efficiently either under the manual control of an operator, or automatically as the case may be, depending upon the manner and type of installation effected.

Method of operation

The original construction of a vehicle having a leveling mechanism according to the principles of my invention is believed obvious and understandable from the foregoing description.

The installation of the invention, however, to an existent vehicle would require a slight alteration. Means such as the flanges 32 would have to be provided on the lower portion of the vehicle for mounting the vehicle on the shaft 30 upon which it pivots. A bracket 42 or its equivalent would necessarily also have to be provided to form a support for the pivot pin 52. In the event of modifying an existent machine, the axle 14 would be pivoted as shown especially in Figure 4.

The operation of the device itself is relatively simple. In Figure 1 in solid lines the vehicle is shown as though traveling over level ground, but for the purposes of this description, let us assume that in the course of the vehicle's travel a ground surface having a slope, indicated by the dotted lines of the axle 14 should be encountered. The wheels 24, 12, and 64 would all tip or tilt to the left in Figure 1, and also would the vehicle body 10.

Under such conditions the piston on the rod 48 within the cylinder 46 would then be permitted to move downwardly in the cylinder to shorten the distance between the pivots 52 and 54, and to thus right the vehicle. The shortening of the distance between points 52 and 54 would be accomplished by permitting fluid to discharge through the tube 58, and fluid under pressure would be introduced into the upper chamber of the cylinder through the tube 56. This introduction and discharge of hydraulic fluid would be under the control of a valve, suitably designed for such purposes, which may either be manually or automatically actuated.

When the vehicle rises to the position indicated by the dotted lines of Figure 1, the lever 36 being rigidly supported and depending from the vehicle will assume a perpendicular position causing the lever 38, through the instrumentality of the coupling or link 40, also to assume a perpendicular position. The stub shaft 22 will thus be returned to the true horizontal, thus righting the ground-engaging member 24. In this way the member 24, which is downhill from the vehicle in Figure 1, is rolling in the true perpendicular and it can tend to prevent downhill slippage of the vehicle. The wheels 12 and 64 which are uphill from the vehicle, are permitted to remain in their tipped or tilted position to support the shaft 62 parallel with the ground surface over which these wheels are travelling. This is necessary, especially in a harvesting mechanism, because the cutter bar and the pick-up mechanism must at all times travel parallel to the ground in order to operate efficiently and as designed. Should the vehicle be later returned to level ground, the body would be righted by the reintroduction of the hydraulic fluid under the piston in the chamber 46 and the discharge of displaced hydraulic fluid from the upper side of the piston through the tube 56.

In Figure 3 I have indicated another condition which the vehicle will encounter in the course of its travelling. That relates to a ground condition where the vehicle is travelling over a surface that slopes to the right and the cutter mechanism is travelling over horizontal ground. In this case, it would be necessary for the distance between the points 52 and 54 to be lengthened to level the vehicle body, and in that event additional hydraulic fluid would be introduced under the piston on the rod 48 causing it to move upwardly in the cylinder and to displace fluid and discharge it through the tube 56. When the vehicle 10 is righted under these conditions, the wheel 24 will also be righted. The wheel 12 fixed for rotation on the shaft 14 will at all times assume an angle approximately at right angles to the ground surface over which it travels.

Because of the fact that the axle 62 is independently pivoted at 63 to the hub of the wheel 24 it can remain horizontal with the ground over which the wheel 64 travels and thus maintain the cutter mechanism that may be supported thereon parallel to that ground surface between the wheels 12 and 64.

By dotted lines in Figure 3 I have indicated that there are many angles that the axle 62 can assume regardless of the plane of the axle 14. In this event, the wheel 24 will tend to hold the vehicle on the hill and against gravity by reason of its travelling in a truly perpendicular path. The wheels 12 and 64 will also tend to hold the vehicle up and against slippage sideways or downhill, due to the fact that there are two such mechanism resisting downward pressure.

The operation of the depending lever 36 and the link 40 to always maintain the wheel 24 in an upright position or parallel to the vertical axis of the vehicle body is believed apparent, and is obtained through the parallel operation of the link 40. This feature is commonly associated with the steering mechanisms of motor vehicles. In this case the distinction, however, is that the pivot pin 18 is supported horizontally rather than vertically.

For the purposes of this description it will be understood that the vehicle 10 is driven forwardly by means not shown, but which would operate upon the vehicle itself. If, however, it is desired to apply draft means to the axle 14, that structure may be readily adapted to the operation of my leveling mechanism and without altering the principle thereof.

Having thus fully described my invention, what I claim as new and desire to secure by Letters Patent is:

1. A leveling mechanism comprising a vehicle-supporting axle having ground-engaging members at either end, one of said ground-engaging members being horizontally pivoted to said axle and having a depending arm, a pair of spaced-apart pivot supporting ears intermediate of the ends of said axle, a pivot shaft mounted in said supporting ears lateral to the axis of said shaft, a vehicle body having depending flanges attached to and supported by said pivot means for lateral movement, a fluid pressure motor attached at one end to said axle and at the other end to said vehicle body to effect lateral pivotal movement of said vehicle body with relation to said axle, an arm depending from said vehicle body and movable therewith, and a coupling link between the depending arm on the ground-engaging member and the depending arm on the vehicle body.

2. A leveling mechanism comprising a vehicle-supporting axle having ground-engaging members at either end, one of said ground-engaging members being horizontally pivoted to said axle and having a depending arm, pivot supporting means intermediate of the ends of said axle, pivot means in said supporting means lateral to the axis of said shaft, a vehicle body supported on said pivot means for lateral movement, a fluid pressure motor including a double-chambered cylinder attached at one end to said axle and having a piston supporting a piston rod attached to said vehicle body to effect lateral pivotal movement of said vehicle body with relation to said axle, an arm depending from said vehicle body and movable therewith, and a coupling link between the depending arm on the ground-engaging member and the depending arm on the vehicle body.

3. A leveling mechanism comprising a vehicle-supporting axle having ground-engaging members at either end, one of said ground-engaging members being horizontally pivoted to said axle and having a depending arm, pivot supporting means above and intermediate of the ends of said axle, pivot means mounted in said supporting means above and lateral to the axis of said shaft, a vehicle body supported on said pivot means for lateral movement, a fluid pressure motor attached at one end to said axle and at the other end to said vehicle body to effect lateral pivotal movement of said vehicle body with relation to said axle, an arm depending from said vehicle body and movable therewith, and a coupling link between the depending arm on the ground-engaging member and the depending arm on the vehicle body.

4. A leveling mechanism comprising a vehicle-supporting axle having ground-engaging members at either end, one of said ground-engaging members being horizontally pivoted to said axle and having a depending arm, pivot supporting ears above and intermediate of the ends of said axle, a pivot shaft mounted in said supporting ears lateral to the axis of said shaft, a vehicle body supported on said pivot shaft for lateral movement, a fluid pressure motor attached at one end to said axle and at the other end to said vehicle body to effect lateral pivotal movement of said vehicle body with relation to said axle, an arm depending from said vehicle body and movable therewith, and a coupling link between the depending arm on the ground-engaging member and the depending arm on the vehicle body.

5. A leveling mechanism comprising a vehicle-supporting axle having ground-engaging members at either end, one of said ground-engaging members being horizontally pivoted to said axle and having a depending arm, pivot supporting ears intermediate of the ends of said axle, a pivot shaft mounted in said supporting ears lateral to the axis of said shaft, a vehicle body supported on said pivot shaft for lateral movement, a fluid pressure motor attached at one end to said axle and at the other end to said vehicle body to effect lateral pivotal movement of said vehicle body with relation to said axle, an arm depending from said vehicle body and movable therewith, and a coupling link between the depending arm on the ground-engaging member and the depending arm on the vehicle body.

6. A leveling mechanism comprising a vehicle-supporting axle having ground-engaging members at either end, one of said ground-engaging members being horizontally pivoted to said axle and having a depending arm, pivot supporting means intermediate of the ends of said axle, pivot means mounted in said supporting means lateral to the axis of said shaft, a vehicle body supported on said pivot means for lateral movement, a fluid pressure motor attached at one end to said axle and at the other end to said vehicle body to effect lateral pivotal movement of said vehicle body with relation to said axle, an arm depending from said vehicle body and movable therewith, and a coupling link between the depending arm on the ground-engaging member and the depending arm on the vehicle body.

7. A leveling mechanism comprising a vehicle-supporting axle having ground-engaging members at either end, one of said members being horizontally pivoted on said axle, pivot supporting ears above and intermediate the ends of said axle, a pivot shaft mounted in said supporting ears lateral to the axis of said axle, a vehicle body supported on said pivot shaft for lateral rocking movement, a fluid pressure motor attached at one end to said axle and at the other end said vehicle body above said axle, and link means between said body and said horizontally pivoted ground engaging member to maintain the latter in a plane parallel to the vertical axis of said body irrespective of the plane of operation of the other said ground engaging member or of said axle.

8. A leveling mechanism comprising a vehicle-supporting axle having a wheel at either end, one of said wheels being horizontally pivoted on said axle, a vehicle body rockably mounted on said axle intermediate its ends, a fluid pressure motor attached at one end to said axle and at the other end to said vehicle to effect limited rocking movement of said vehicle with relation to said axle, and link means between said body and said horizontally pivoted wheel to maintain the latter in a plane parallel to the vertical axis of said body irrespective to the plane assumed by the other said wheel as it passes over the ground.

ERNEST COBURN.